United States Patent [19]
Moeggenborg et al.

[11] Patent Number: 5,358,911
[45] Date of Patent: Oct. 25, 1994

[54] POLYMERIC BINDERS FOR CERAMIC PROCESSING

[75] Inventors: Kevin J. Moeggenborg, Aurora; Peter E. Reed, Naperville, both of Ill.

[73] Assignee: Nalco Chemical Company, Naperville, Ill.

[21] Appl. No.: 134,721

[22] Filed: Oct. 12, 1993

[51] Int. Cl.$^5$ .............................................. C04B 35/02
[52] U.S. Cl. ........................................ 501/94; 264/63
[58] Field of Search .................... 264/63, DIG. 61; 554/30

[56] References Cited

U.S. PATENT DOCUMENTS

| | | | |
|---|---|---|---|
| 3,917,778 | 11/1975 | Shiraki et al. | 264/63 |
| 4,416,974 | 11/1983 | Scheve | 430/288 |
| 4,968,460 | 11/1990 | Thompson et al. | 264/6 |
| 5,082,607 | 1/1992 | Tange et al. | 264/44 |
| 5,198,489 | 3/1993 | Sterzec et al. | 524/439 |
| 5,250,085 | 10/1993 | Mevissen | 51/298 |
| 5,258,151 | 11/1993 | Bayer et al. | 264/63 |
| 5,268,233 | 12/1993 | Heller et al. | 428/523 |

FOREIGN PATENT DOCUMENTS

3005349A2  1/1991  Japan.

Primary Examiner—Mark L. Bell
Assistant Examiner—A. Wright
Attorney, Agent, or Firm—Robert A. Miller; Joseph B. Barrett; James J. Drake

[57] ABSTRACT

A composition suitable for use as a binder of ceramic materials and a method for preparing a ceramic material which provides relatively greater green ceramic strength is disclosed. The improved binder contains a substantially hydrolyzed copolymer made from monomers having ester or amide functional groups, poly(vinyl amine), poly(vinyl formamide) or a copolymer of vinyl alcohol and vinyl amine. The binder is combined with an aqueous solution containing a ceramic powder to make a slurry, and the slurry is subsequently spray dried, pressed and heated to make a ceramic.

11 Claims, No Drawings

POLYMERIC BINDERS FOR CERAMIC PROCESSING

TECHNICAL FIELD OF THE INVENTION

This invention relates to polymeric binders for the preparation of pressed ceramics.

BACKGROUND OF THE INVENTION

Ceramic materials are commonly prepared by mixing powdered ceramic oxides such as magnesia, alumina, titania and zirconia, in a slurry along with additives, such as dispersants and binders. The slurry may be spray dried to produce ceramic particles. The particles are pressed into an aggregate structure, called a "green ceramic," having a desired shape and subsequently subjected to a severe heat treatment known as sintering. The sintering process converts the green ceramic into a cohesive "fired ceramic", having a nearly monolithic polycrystalline ceramic phase.

The binder serves to hold the ceramic particles of the green ceramic in the desired shape after pressing. The binder can also provide lubrication while the particles are pressed. Preferably, the binder combusts or vaporizes completely during the sintering process leaving no trace of the binder in the fired ceramic. In performing these functions, binders significantly affect the properties of the fired ceramics which are ultimately produced.

In commercial practice, poly(vinyl alcohols) are widely used as ceramic binders. Additionally, poly(ethylene oxide) and ethylene-vinyl acetate copolymers reportedly have been used as binders for particulate material, such as granular silica gel.

Although commercially available binders are satisfactory for many applications, a need exists for improved binders which provide still greater strength in green ceramic materials. Greater green strength reduces breakage during handling of the green ceramics and, generally, is associated with higher quality fired ceramics. Preferably, the improved binders would be cheaper and more versatile than previously known binders.

SUMMARY OF THE INVENTION

The present invention is directed to an improved binder composition for preparing a ceramic material. The binder may comprise a substantially hydrolyzed copolymer of a vinyl ester and an N-vinyl amide.

The ester is of the formula:

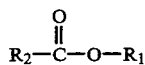

wherein $R_1$ is an unsaturated acyclic hydrocarbon group having about 2 to about 4 carbon atoms and $R_2$ is an alkyl group having 1 to about 4 carbon atoms.

The amide is of the formula:

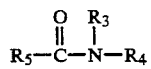

wherein $R_3$ is hydrogen or an alkyl group having 1 to about 4 carbon atoms, $R_4$ is an unsaturated acyclic hydrocarbon group having about 2 to about 4 carbon atoms and $R_5$ is hydrogen or an alkyl group having 1 to about 4 carbon atoms. The binder may also comprise the homopolymers poly(vinyl amine) or poly(vinyl formamide). Similarly, a copolymer of vinyl alcohol and vinyl amine may be used as a binder.

In another aspect, the invention is directed to a copolymer useful in binder compositions for preparing processed ceramics that may be a block, an alternating or a random copolymer. The copolymer is of the formula:

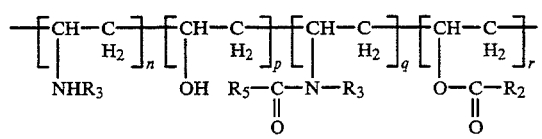

wherein $R_2$ is an alkyl group having 1 to about 4 carbon atoms, $R_3$ is hydrogen or an alkyl group having 1 to about 4 carbon atoms, and $R_5$ is hydrogen or an alkyl group having 1 to about 4 carbon atoms. The sum of n and q is in the range of about 2 to about 100 mole percent, and the sum of p and r is in the range of about 98 to about 0 mole percent. The ratio r/p is about 0 to about 0.67, and the range of the ratio q/n is about 0 to about 20. Amine groups may be present in the form of a salt derived from an acid or a mixture of acids. Suitable acids include, but are not limited to, formic acid, acetic acid, hydrochloric acid, and sulfuric acid.

The polymeric binders are used to prepare ceramic materials in a process in which a ceramic powder is mixed with an aqueous solution of the polymeric binder to produce a slurry which is dried to produce particles. An aggregate, green ceramic structure formed of particles produced from a slurry containing the improved binder exhibits relatively greater strength than green ceramic structures provided by previously known methods. The particles are compacted and heated to produce a fired ceramic material.

DESCRIPTION OF PREFERRED ASPECTS OF THE INVENTION

The present invention relates to polymeric binders for preparing ceramic materials. The method can be used to produce fired ceramic materials from ceramic powders. Suitable powders include but are not limited to: aluminum oxide, silicon nitride, aluminum nitride, silicon carbide, silicon oxide, magnesium oxide, lead oxide, zirconium oxide, titanium oxide and neodymium oxide. Aluminum oxide is presently preferred. The powder can have a weight-averaged median particle size in the range of a few nanometers to about ½ millimeter. Powders having a median size in the range of about 0.5 to about 10 micrometers are preferred.

In one aspect, the ceramic powder is mixed with an aqueous solution containing a polymer to produce a slurry. Preferably, the solution is prepared using deionized water. The slurry may also contain lubricants and surfactants, such as dispersants and anti-foaming agents.

The polymer is, for example, synthesized from monomers by free radical polymerization in the presence of an initiator, such as a peroxide, a peroxyester or an azo initiator. In the synthesis of a copolymer, one of the monomers is an ester of the formula:

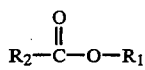

wherein $R_1$ is an unsaturated acyclic hydrocarbon group having about 2 to about 4 carbon atoms and $R_2$ is an alkyl group having 1 to about 4 carbon atoms. Preferably, the ester is vinyl formate, vinyl acetate, vinyl propionate, vinyl butyrate, allyl formate, allyl acetate, allyl propionate, allyl butyrate, isopropenyl formate, isopropenyl acetate, isopropenyl propionate or isopropenyl butyrate. More preferably, the ester is vinyl acetate.

The amide is of the formula:

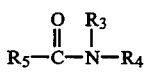

wherein $R_3$ is hydrogen or an alkyl group having from 1 to about 4 carbon atoms, $R_4$ is an unsaturated acyclic hydrocarbon group having about 2 to about 4 carbon atoms, and $R_5$ is hydrogen or an alkyl group having 1 to about 4 carbon , atoms. Examples of suitable amides are N-vinyl-formamide, N-vinyl-acetamide, N-vinyl-propionamide, N-vinyl-butyramide, N-methyl-N-vinyl-formamide, N-methyl-N-vinyl-acetamide, N-methyl-N-vinyl-propionamide, N-methyl-N-vinyl-butyramide, N-ethyl-N-vinyl-formamide, N-ethyl-N-vinyl-acetamide, N-ethyl-N-vinyl-propionamide, N-ethyl-N-vinyl-butyramide, N-propyl-N-vinyl-acetamide, and N-butyl-N-vinyl-acetamide. Preferably, the amide is N-methyl-N-vinyl-acetamide, N-vinyl acetamide or N-vinyl formamide.

The copolymer of the ester and the amide is substantially hydrolyzed. During hydrolysis, ester groups and amide groups present in the copolymer as pendant substituents are cleaved by water to produce pendant hydroxyl groups and pendant amino groups, respectively. The presence of an acid, such as aqueous hydrochloric acid, catalyzes the hydrolysis reaction. Alternatively, the hydrolysis reaction can be catalyzed by a strong base. Preferably, at least about 60 percent, more preferably, at least about 80 percent of the total pendant ester substituents in the copolymer are hydrolyzed. The amount of hydrolyzed pendant amide substituents is in the range of about 5 to about 100 mole percent.

Monomers for homopolymerization include, but are not limited to, N-vinyl formamide, which may be hydrolyzed after polymerization to form poly(vinyl amine). A copolymer of vinyl alcohol and vinyl amine also may be employed as a binder in the present invention.

The polymer preferably has a weight-average molecular weight in the range of about 2,000 to about 500,000 g/mole, and more preferably in the range of about 2,000 to about 250,000 g/mole. A chain transfer agent, such as thioglycolic acid, can be utilized during polymerization of the copolymer to control the molecular weight.

Spray drying is an evaporative process in which liquid is removed from a slurry containing a liquid and a substantially non-volatile solid. The liquid is vaporized by direct contact with a drying medium, usually air, in an extremely short retention time, on the order of about 3 to about 30 seconds. The primary controlling factors in a spray drying process are particle size, particle size distribution, particle shape, slurry density, slurry viscosity, temperature, residence time, and product moisture.

The viscosity of the slurry must be suitable for handling and spray-drying. Although spray-drying equipment conditions may be adjusted to handle a variety of viscosities, larger particles will usually result from higher viscosity slurries.

Those of ordinary skill in the art are familiar with the spray-drying process used in the production of ceramic materials and will be able to optimize the control factors of spray-drying to best advantage. Alternatively, the spray drying process may be replaced by other well known drying methods, such as granulation, tape casting and slip casting.

Spray drying of the slurry produces substantially dry, free-flowing powder particles which contain the ceramic, the binder and the optional materials described above. The dry particles are granules which are generally spheroidal in shape and have an effective diameter of about 50 to about 200 micrometers. Typically, about 0.5 percent to about 8 percent of the binder, based on the dry weight of the ceramic powder, is present in the dry particles.

The dry particles are compacted to produce an aggregate, green ceramic structure. Preferably, the particles are compacted by pressing in dies having an internal volume which approximates the shape desired for the final fired ceramic product. Alternatively, the particles are compacted by roll compacting or other well-known compacting methods. The spray dried blend of powder, binder, and optional surfactants and lubricants is relatively free flowing so that it can enter and closely conform to the shape of the pressing dies.

Inside the dies, the dry particles are subjected to a pressure which is typically in the range of about 5000 to about 50,000 psi. Pressing the particles produces an aggregate structure, called a green ceramic, which retains its shape after removal from the die.

Heating the aggregate structure drives off volatile materials such as water, and burns off organic materials, such as binders or surfactants. When a sufficiently high temperature is reached, the particles of the aggregate structure begin to fuse, but do not fuse completely, and become fastened to one another to produce a relatively strong fired ceramic material having essentially the desired shape.

In another aspect, the invention relates to a polymer and a method for preparing a ceramic material which comprises mixing a ceramic powder with an aqueous solution containing either a salt of a copolymer having repeating units, a homopolymer or a vinyl alcohol-vinyl amine copolymer to produce a slurry. The salt of a copolymer having repeating units can be prepared by copolymerizing an ester and an amide, followed by hydrolyzing pendant carboxylic acid derivative substituents, as described above. If a copolymer is made, the repeating units are preferably arranged in random order along a principal polymer chain. The polymer is of the formula:

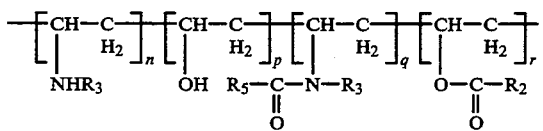

wherein $R_2$ is an alkyl group having 1 to about 4 carbon atoms, $R_3$ is hydrogen or an alkyl group having 1 to about 4 carbon atoms, and $R_5$ is hydrogen or an alkyl group having 1 to about 4 carbon atoms. The sum of n and q is in the range of about 2 to about 100 mole percent, and the sum of p and r is in the range of about 98 to about 0 mole percent. The ratio r/p is about 0 to about 0.67, and the range of the ratio q/n is about 0 to about 20. Amine groups may be present in the form of a salt derived from an acid or a mixture of acids. Suitable acids include, but are not limited to, formic acid, acetic acid, hydrochloric acid, and sulfuric acid. Minor amounts of other materials, such as a residue of initiators and chain transfer agents, may be present with the polymeric salt in insubstantial quantities.

The slurry is, for example, spray dried to produce substantially dry particles which include the salt. The particles are preferably pressed to produce an aggregate, green ceramic structure and heated to produce a fired ceramic material. Alternatively, the particles can be formed into an aggregate, green ceramic structure by roll compaction or other well-known methods.

It is also recognized that the properties of a ceramic such as, but not limited to, green density, surface quality or milling characteristics, may be varied as desired by adjusting the ratio of the different monomers in a copolymer, the degree of hydrolysis of a copolymer and the molecular weight of the polymer used in the binder composition.

The following examples are presented as a means of further communicating the invention, but are not intended to limit the scope of the disclosure or the claims.

EXAMPLE 1

A relatively low molecular weight N-methyl-N-vinylamine/vinyl alcohol copolymer was prepared by hydrolysis of a copolymer of N-methyl-N-vinyl acetamide and vinyl acetate. 46.5 grams of vinyl acetate and 350 grams of toluene were blended in a reactor and heated to 68° C. under a nitrogen gas purge. An azo initiator, 0.2 grams of 2,2'-azobis (2-methylpropanenitrile), was added to the reactor to initiate free radical polymerization. The nitrogen purge was continued and, after 15 minutes, 53.5 grams of N-methyl-N-vinyl acetamide in 49.2 grams of toluene was slowly added over a period of 2 hours using an addition funnel. Subsequently, the reactor was maintained at 68° C. with nitrogen purge for an additional 3 hours, and then cooled.

It was determined gravimetrically that the polymerization conversion at this point was 22 percent. Another 0.2 grams of the azo initiator was added over a period of three hours at 71° C., increasing the conversion to 40 percent. Then 2.0 grams of the azo initiator in a carrier liquid consisting of 10 grams of toluene, 20 grams of hexane and 20 grams of tetrahydrofuran was added to the reaction mixture over a period of about three hours. The total amount of initiator utilized was 2.4 weight percent, based on the weight of the monomers.

The polymerized reaction mixture was concentrated under vacuum to 140 grams and added to hexane to precipitate and harden the polymerization product. The polymer was then separated from the hexane mixture and dissolved in about 60 milliliters of ethanol.

The polymerization product, a copolymer, was substantially hydrolyzed with 4 equivalents of aqueous 12 normal hydrochloric acid and isolated by precipitation. More specifically, the mixture described above was stirred with 167 milliliters of 12 normal hydrochloric acid and 50 milliliters of water. The solution so produced was heated to reflux and about 20 grams of condensate, which contained some residual toluene, was collected. The solution was then refluxed at 95° C. for 48 hours.

Isolation of the copolymer product was accomplished by precipitation and filtration. 55 grams of concentrated sulfuric acid was introduced dropwise into the solution with stirring. The acidified solution was then precipitated into 3.5 liters of isopropanol and filtered.

The salt of the hydrolyzed copolymer product was recovered from the filter as a brown solid product. The product was obtained in 35 percent of overall theoretical yield and exhibited a weight-average molecular weight of about 10,200 g/mole as determined by gel permeation chromatography.

EXAMPLE 2

A N-methylvinylamine/vinyl alcohol copolymer salt synthesized by the procedure described in Example 1 above, was tested as a binder for alumina particles of the type that are commonly used for producing ceramic materials. The polymer had a weight-average molecular weight of 10,200 g/mole and was obtained in the form of a salt of a substantially hydrolyzed copolymer.

A sample of the polymer was mixed with water to prepare a 13.5 weight percent solution based on the weight of the sample. 53.89 grams of the solution were combined with an additional 13.6 grams of water, 0.88 grams of a commercially available dispersant, and 175 grams of alumina, available from Alcoa under the tradename Alcoa A152 SG. The dispersant is commercially available from Daishowa Chemicals, Inc. under the tradename Marasperse CBOS-4. The combined ingredients were mixed with a propeller stirrer and an additional 11 grams of water were then added to dilute a resulting slurry.

The slurry was milled for 3 hours in a 1 liter jar mill containing about 250 grams of milling media. The milled slurry was relatively thick. After adding 78 grams of water to the milled slurry, the viscosity of the slurry was measured as 700 centipoise using a Brookfield LVT Viscometer.

The milled slurry was spray dried in a Yamato DL-41 laboratory spray dryer. Dryer operating conditions were: 250° C. air inlet temperature, atomizing air setting of 1.2, slurry feed pump setting of 5, and drying air feed rate of 0.7 cubic meters per minute. A dry powder was produced which was recovered, screened and stored overnight in a 20 percent relative humidity chamber.

The screened powder was pressed into four pellets in a Carver laboratory press, two at 15,000 pounds per square inch pressing force and two at 25,000 pounds per square inch pressing force. The pellets were approximately 28.7 millimeters in diameter and 5 to 6 millimeters in height. The dimensions and weights of the pellets were measured and the pellets were crushed to determine the force required to break them. Diametral compression strength (DCS) for each of the pellets was determined from the breaking force and the pellet dimensions. The average diametral compression strength in megapascals for each set of two pellets is presented below in Table 1.

TABLE 1

Green Ceramic Prepared by Present Method

| Pressing Force (psi) | Strength DCS (MPa) |
| --- | --- |
| 15,000 | 0.60 |
| 25,000 | 1.05 |

EXAMPLE 3

The procedure described above in Example 2 was performed again, except that a conventional binder polyvinyl alcohol was used in place of the hydrochloric acid salt of the hydrolyzed copolymer. The conventional binder was combined in an amount corresponding to 5.0 weight percent of active binder ingredients, based on the weight of the alumina in the slurry. As in Example 2 above, four green ceramic pellets were prepared utilized two different levels of pressing force. The average diametral compression strengths in megapascals for pellets formed at each of the pressing force levels are presented below in Table 2.

TABLE 2

Green Ceramic Prepared by Conventional Method

| Pressing Force (psi) | Strength DCS (MPa) |
| --- | --- |
| 15,000 | 0.67 |
| 25,000 | 0.84 |

Comparison of the data in Table 2 and Table 3 reveals that green ceramic pellets prepared with the salt of the hydrolyzed copolymer exhibited significantly greater diametral compression strength than did green ceramic pellets prepared with the conventional polyvinyl alcohol binder. In both examples, the pellets contained 5.0 weight percent of active binder ingredients. The weight of chloride present in the salt of the hydrolyzed copolymer of Example 2 was included in the weight of active ingredients. This calculation method is believed to favor the conventional binder. Also, diametral compressive strength comparisons at relatively greater absolute strength values are believed to be more accurate. The greater strengths are calculated from greater required breaking forces, which are relatively more amenable to accurate measurement.

EXAMPLE 4

The procedure described in Example 2 was performed on the following polymer compositions.

TABLE 3

| Sample | Polymer Composition | MW (g/mol) |
| --- | --- | --- |
| A | 95%/6% poly(vinyl alcohol/vinyl amine) | 100,000 |
| B | poly(vinyl amine) | 10,400 |
| C | poly(vinyl amine) | 32,000 |
| D | poly(vinyl amine) | 40,000 |
| E | poly(vinyl amine) | 225,000 |
| F | poly(vinyl formamide) | 225,000 |

The average diametral compression strengths in megapascals for pellets formed at 15,000 psi and 25,000 psi for each polymer composition are presented below in Table 4.

TABLE 4

| Sample | Strength DCS (Mpa) at Pressing Force 15,000 psi | Strength DCS (Mpa) at Pressing Force 25,000 psi |
| --- | --- | --- |
| A | — | 3.06 |
| B | — | 0.248 |
| C | 0.03 | 0.142 |
| D | 0.06 | 0.181 |
| E | — | 0.224 |
| F | — | 0.07 |

The poly(vinyl alcohol/vinyl amine) used in Sample A was obtained from the Air Products Company. Poly(vinyl amine) and poly(vinyl formamide) may be synthesized using known procedures.

Although particular aspects have been described and examples presented for the purpose of clarity, it is not intended that the invention be limited to the described aspects and examples. The scope of the invention is intended to be as broad as the claims will allow. Further, although certain theories have been advanced, the success of the invention does not stand or fall with the theories.

We claim:

1. A method for preparing a ceramic material, which comprises:

mixing a ceramic powder with an aqueous solution containing a substantially hydrolyzed polymer of an ester and an amide to produce a slurry, said ester being of the formula:

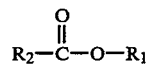

wherein $R_1$ is a vinyl group, and $R_2$ is an alkyl group having 1 to about 4 carbon atoms, and said amide being of the formula:

wherein $R_3$ is hydrogen or an alkyl group having 1 to about 4 carbon atoms, $R_4$ is a vinyl group, and $R_5$ is hydrogen or an alkyl group having 1 to about 4 carbon atoms said polymer having a weight-average molecular weight of about 2000 to about 500,000 g/mole;

drying the slurry to produce particles which include said polymer;

compacting the particles to produce an aggregate structure; and heating the aggregate structure to produce a fired ceramic material.

2. The method of claim 1 wherein the ester is vinyl acetate.

3. The method of claim 1 wherein the amide is N-vinyl acetamide or N-vinyl formamide.

4. The method of claim 1 wherein the amide is N-methyl-N-vinyl-acetamide.

5. The method of claim 1 wherein the hydrolyzed polymer contains about 5 to about 90 mole percent pendant hydroxyl substituents and about 5 to about 95 mole percent pendant amino substituents.

6. A method for preparing a ceramic material, which comprises:

mixing a ceramic powder with an aqueous solution containing a polymer having repeating units to produce a slurry, said polymer being of the formula:

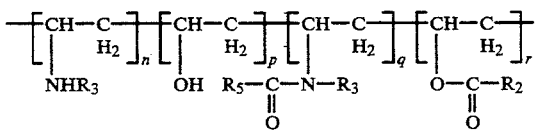

wherein $R_2$ is an alkyl group having 1 to about 4 carbon atoms, $R_3$ is hydrogen or an alkyl group having 1 to about 4 carbon atoms, $R_5$ is hydrogen or an alkyl group having 1 to about 4 carbon atoms, the sum of n and q is in the range of about 2 to about 100 mole percent, the sum of p and r is in the range of about 98 to about 0 mole percent, the ratio r/p is about 0 to about 0.67, and the range of the ratio q/n is about 0 to about 20 said polymer having a weight-average molecular weight of about 2000 to about 500,000 g/mole.

drying the slurry to produce particles which include said polymer;

compacting the particles to produce an aggregate structure; and heating the aggregate to produce a fired ceramic material.

7. The method of claim 6 wherein said repeating units are present in random order.

8. The method of claim 6 wherein said polymer has a weight-average molecular weight of about 2,000 to about 500,000 g/mole.

9. A method for preparing a ceramic material which comprises:

mixing a ceramic powder with an aqueous solution containing a polymer selected from the group consisting of hydrolyzed poly(vinyl amine), poly(vinyl formamide) and poly(vinyl alcohol/vinyl amine) to form a slurry;

drying the slurry to produce particles which include said polymer;

compacting the particles to produce an aggregate structure; and heating the aggregate structure to produce a fired ceramic material.

10. The method of claim 6 wherein at least about 80 percent of the total pendant ester substituents in the polymer are hydrolyzed.

11. The method of claim 9 wherein at least about 80 percent of the total pendant ester substituents in the copolymer are hydrolyzed.

* * * * *

UNITED STATES PATENT AND TRADEMARK OFFICE
CERTIFICATE OF CORRECTION

PATENT NO. : 5,358,911
DATED : OCTOBER 25, 1994
INVENTOR(S) : KEVIN J. MOEGGENBORG & PETER E. REED

It is certified that error appears in the above-indentified patent and that said Letters Patent is hereby corrected as shown below:

CLAIM 6, COLUMN 9, LINE 21 ratio q/n is about 0 to about 20 said polymer having a weight-average molecular weight of about 2000 to about 500,000 g/mole.

SHOULD READ:

ratio q/n is about 0 to about 20 wherein at least about 60 mole percent of the total pendant ester substituents in the polymer are hydrolyzed and wherein about 5 to about 100 mole percent of the total pendant amide substituents in the polymer are hydrolyzed.

UNITED STATES PATENT AND TRADEMARK OFFICE
CERTIFICATE OF CORRECTION

PATENT NO. : 5,358,911
DATED : October 25, 1994
INVENTOR(S) : Kevin J. Moeggenborg & Peter E. Reed It is certified that error appears in the above-indentified patent and that said Letters Patent is hereby corrected as shown below:

CLAIM 9, COLUMN 10, LINE 12 sisting of hydrolyzed poly(vinyl amine), poly(vinyl

SHOULD READ:

sisting of poly(vinyl amine), hydrolyzed poly(vinyl

Signed and Sealed this

Tenth Day of January, 1995

Attest:

BRUCE LEHMAN

Attesting Officer

Commissioner of Patents and Trademarks